(12) United States Patent
Bae (10) Patent No.: US 9,973,009 B2
(45) Date of Patent: May 15, 2018

(54) WIRELESS POWER TRANSMISSON APPARATUS AND WIRELESS POWER TRANSMISSON METHOD

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 462 days.

(21) Appl. No.: 14/657,713

(22) Filed: Mar. 13, 2015

(65) Prior Publication Data

US 2015/0263535 A1 Sep. 17, 2015

(30) Foreign Application Priority Data

Mar. 13, 2014 (KR) ........................ 10-2014-0029925

(51) Int. Cl.

| H01F 27/42 | (2006.01) |
|---|---|
| H02J 5/00 | (2016.01) |
| H02J 7/02 | (2016.01) |
| H04B 5/00 | (2006.01) |
| H02J 50/40 | (2016.01) |
| H02J 50/12 | (2016.01) |

(52) U.S. Cl.
CPC ............. H02J 5/005 (2013.01); H02J 7/025 (2013.01); H02J 50/12 (2016.02); H02J 50/40 (2016.02); H04B 5/0031 (2013.01); H04B 5/0037 (2013.01)

(58) Field of Classification Search
None
See application file for complete search history.

(56) References Cited

U.S. PATENT DOCUMENTS

| 2009/0230777 A1 | 9/2009 | Baarman et al. |
| 2010/0225271 A1 | 9/2010 | Oyobe et al. |

(Continued)

FOREIGN PATENT DOCUMENTS

| CN | 101835653 A | 9/2010 |
| CN | 102695629 A | 9/2012 |

(Continued)

*Primary Examiner* — Lincoln Donovan
*Assistant Examiner* — Khareem E Almo
(74) *Attorney, Agent, or Firm* — Birch, Stewart, Kolasch & Birch, LLP (57) ABSTRACT

A wireless power transmission apparatus and a wireless power transmission method includes: activating a first wireless transmission unit having a first transmission scheme and deactivating a second transmission unit having a second transmission scheme; transmitting power by the first transmission scheme when a reception scheme of a wireless power reception apparatus is same as the first transmission scheme; deactivating the first wireless transmission unit and activating the second wireless transmission unit when the reception scheme is different from the first transmission scheme; and transmitting the power by the second transmission scheme when the reception scheme is same as the second transmission scheme. Interference between the first wireless transmission unit and the second wireless transmission unit can be prevented from occurring by selectively or sequentially activating the first wireless transmission unit and the second wireless transmission unit.

11 Claims, 5 Drawing Sheets

(56) References Cited

U.S. PATENT DOCUMENTS

| | | |
|---|---|---|
| 2010/0259217 A1 | 10/2010 | Baarman et al. |
| 2010/0311327 A1 | 12/2010 | Hamada |
| 2011/0181240 A1 | 7/2011 | Baarman et al. |
| 2012/0161535 A1 | 6/2012 | Jung et al. |
| 2012/0161696 A1 | 6/2012 | Cook et al. |
| 2012/0242160 A1* | 9/2012 | Tseng .............. H04B 5/0037 307/104 |
| 2012/0248890 A1 | 10/2012 | Fukushima |
| 2013/0082653 A1 | 4/2013 | Lee et al. |
| 2013/0099734 A1* | 4/2013 | Lee ..................... H02J 7/007 320/108 |
| 2014/0197785 A1* | 7/2014 | Lee ..................... H02J 7/025 320/108 |
| 2015/0061403 A1 | 3/2015 | Jeong et al. |
| 2015/0214775 A1* | 7/2015 | Lee ..................... H02J 7/025 320/137 |
| 2015/0270740 A1* | 9/2015 | Lee ..................... H02J 7/025 320/108 |
| 2016/0049826 A1* | 2/2016 | Lee ..................... H02J 7/025 320/108 |
| 2016/0056637 A1* | 2/2016 | Hwang ................ H02J 17/00 307/104 |
| 2016/0134334 A1* | 5/2016 | Park .................... H02J 5/005 307/104 |
| 2016/0197494 A1* | 7/2016 | Kwon ................ H04B 5/0037 307/104 |
| 2016/0233728 A1* | 8/2016 | Park .................... H04L 1/00 |
| 2016/0241085 A1* | 8/2016 | Park .................... H02J 50/80 |
| 2016/0359372 A1* | 12/2016 | Lee ..................... H02J 7/025 |
| 2016/0359375 A1* | 12/2016 | Lee ..................... H02J 50/12 |
| 2017/0005518 A1* | 1/2017 | Jung ..................... H02J 5/005 |
| 2017/0098149 A1* | 4/2017 | Kesler ................. H02J 50/12 |
| 2017/0117756 A1* | 4/2017 | Muratov ............. H02J 50/60 |
| 2017/0126064 A1* | 5/2017 | Lee ..................... H02J 50/12 |

FOREIGN PATENT DOCUMENTS

| | | |
|---|---|---|
| CN | 103249592 A | 8/2013 |
| CN | 203233243 U | 10/2013 |
| JP | 2010-268665 A | 11/2010 |
| JP | 2013-212004 A | 10/2013 |
| JP | 2014-541134 A | 3/2014 |
| JP | 2015-50932 A | 3/2015 |
| KR | 10-2012-0110927 A | 10/2012 |
| KR | 10-2013-0036539 A | 4/2013 |
| WO | WO 2012/102157 A1 | 8/2012 |
| WO | WO 2012/133446 A1 | 10/2012 |
| WO | WO 2015/115334 A1 | 8/2015 |

* cited by examiner

WIRELESS POWER TRANSMISSON APPARATUS AND WIRELESS POWER TRANSMISSON METHOD

BACKGROUND

The embodiment relates to a wireless power charging system, and more particularly, to a wireless power transmission apparatus and a wireless power transmission method of a wireless power charging system.

In general, various electronic devices are equipped with batteries and operated using power charged in the batteries. In this case, the battery is replaceable and rechargeable in the electronic device. To this end, the electronic device is equipped with a connecting terminal for a connection with an external charging device for charging the battery. In other words, the electronic device is electrically connected with the charging device through the connecting terminal. However, because the connector terminal in the electronic device is exposed to the outside, the connector terminal may be contaminated with foreign matters or shorted due to moisture. In this case, connection failures occur between the connecting terminal and the charging device so that the battery in the electronic device may not be charged.

In order to solve the above problem, there has been suggested a wireless power charging system. The wireless power charging system includes a wireless power transmission apparatus and a wireless power reception apparatus. In this case, the electronic device is implemented as the wireless power reception apparatus. In addition, numerous charging schemes exist for the wireless power charging system. In this case, to receive the power from the wireless power reception apparatus, a preset charging scheme in the wireless power transmission apparatus is required to be preset in the wireless power reception apparatus. Accordingly, when the charging scheme preset in the wireless power transmission apparatus is different from the charging scheme preset in the wireless power reception apparatus, the wireless power reception apparatus may not receive the power from the wireless power transmission apparatus.

SUMMARY

Therefore, the embodiment provides a wireless power transmission apparatus and a wireless power transmission method, capable of efficiently transmitting power. In addition, the embodiment provides a wireless power transmission apparatus and a wireless power transmission method capable of transmitting power according to numerous charging schemes.

A wireless power transmission apparatus according to the embodiment includes: a first wireless transmission unit having a first transmission scheme; a second wireless transmission unit having a second transmission scheme; a controller to transmit the power by the first transmission scheme or the second transmission scheme.

In this case, in the wireless power transmission apparatus according to the embodiment, the controller may activate the first wireless transmission unit, deactivates the second wireless transmission unit, and transmits the power by the first transmission scheme when a reception scheme of a wireless power reception apparatus is same as the first transmission scheme.

In addition, in the wireless power transmission apparatus according to the embodiment, the controller may deactivate the first wireless transmission unit and activate the second wireless transmission unit when the reception scheme is different from the first transmission scheme, and transmit the power by the second transmission scheme when the reception scheme is same as the second transmission scheme.

Further, in the wireless power transmission apparatus according to the embodiment, the controller may activate the first wireless transmission unit and deactivate the second wireless transmission unit when the reception scheme is different from the second transmission scheme.

Furthermore, in the wireless power transmission apparatus according to the embodiment, the controller may determine whether the wireless power reception apparatus exists, and identify the reception scheme when the wireless power reception apparatus exists.

A wireless power transmission method according to the embodiment includes: activating a first wireless transmission unit having a first transmission scheme and deactivating a second transmission unit having a second transmission scheme; and transmitting power by the first transmission scheme when a reception scheme of a wireless power reception apparatus is same as the first transmission scheme.

In addition, the wireless power transmission method according to the embodiment may further include: deactivating the first wireless transmission unit and activating the second wireless transmission unit when the reception scheme is different from the first transmission scheme, and transmitting the power by the second transmission scheme when the reception scheme is same as the second transmission scheme.

Further, the method for transmitting wireless power according to the embodiment may further include: activating the first wireless transmission unit having the first transmission scheme and deactivating the second wireless transmission unit having the second transmission scheme when the reception scheme is same as the second transmission scheme.

Furthermore, the method for transmitting wireless power according to the embodiment may further include: determining whether the wireless power reception apparatus exists, and identifying the reception scheme when the wireless power reception apparatus exists.

The wireless power transmission apparatus and the wireless power transmission method according to the embodiment can charge the wireless power reception apparatus having various reception schemes because the power can be transmitted by numerous transmission schemes. In this case, the wireless power transmission apparatus can prevent interference between the first wireless transmission unit and the second wireless transmission unit by selectively or sequentially activating the first wireless transmission unit and the second wireless transmission unit. Therefore, the wireless power transmission apparatus can more efficiently transmit the power. In other words, the wireless power transmission apparatus can more efficiently charge the wireless power reception apparatus.

DETAILED DESCRIPTION OF THE EMBODIMENTS

Hereinafter, embodiments will be described in detail with reference to accompanying drawings. In this case, it is noted that the same reference numerals are assigned to the same elements as much as possible. In addition, the details of well-known functions or configurations that may make the subject matter of the embodiments unclear will be omitted in the following description.

Figure 1:
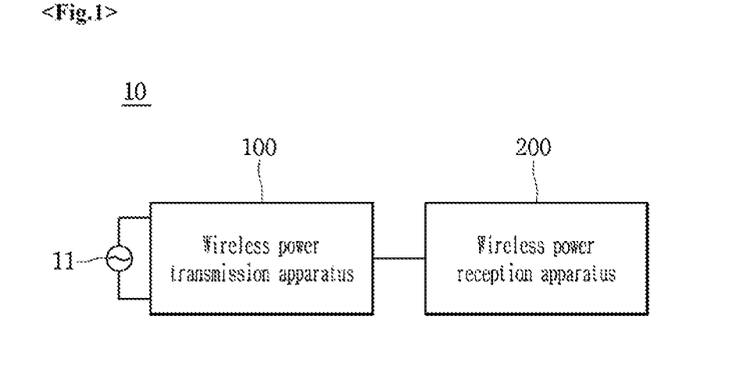
FIG. 1 is a block diagram showing a configuration of a wireless power charging system according to the embodiment.

FIG. 1 is a block diagram showing a wireless power charging system according to the embodiment.

Referring to FIG. 1, a wireless power charging system 10 according to the embodiment includes a wireless power transmission apparatus 100 and a wireless power reception apparatus 200.

The wireless power transmission apparatus 100 is connected to a power source 11 to receive power from the power source 11. In addition, the wireless power transmission apparatus 100 wirelessly transmits the power. In this case, the wireless power transmission apparatus 100 may transmit AC power. In this case, the wireless power transmission apparatus 100 transmits the power according to various transmission schemes. The transmission schemes include an electromagnetic induction scheme, a resonance scheme, and an RF/micro wave radiation scheme. In other words, at least one of the charging schemes is preset to the wireless power transmission apparatus 100. In addition, the wireless power transmission apparatus 100 may transmit the power through any one of the preset charging schemes.

The wireless power reception apparatus 200 wirelessly receives the power. In this case, the wireless power reception apparatus 200 may receive the AC power. In addition, the wireless power reception apparatus 200 may convert the AC power into DC power. In this case, the wireless power reception apparatus 200 receives the power according to a preset reception scheme. In this case, the reception schemes include an electromagnetic induction scheme, a resonance scheme, and an RF/micro wave radiation scheme. In addition, the wireless power reception apparatus 200 may be operated using the power.

Figure 2:
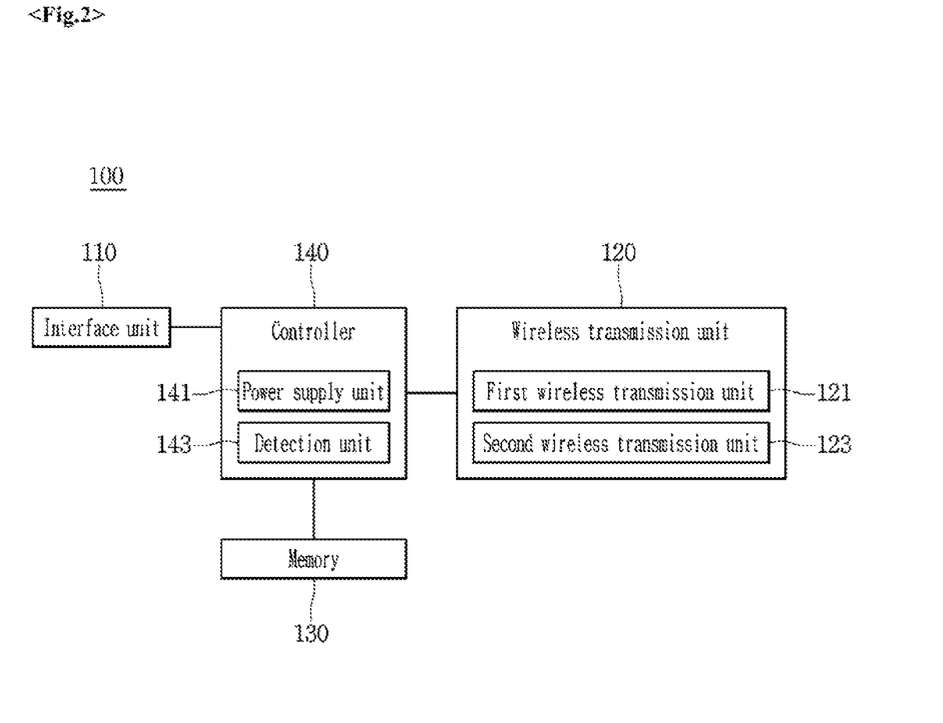
FIG. 2 is a block diagram showing an internal configuration of the wireless power transmission apparatus according to the embodiment.
Figure 3:
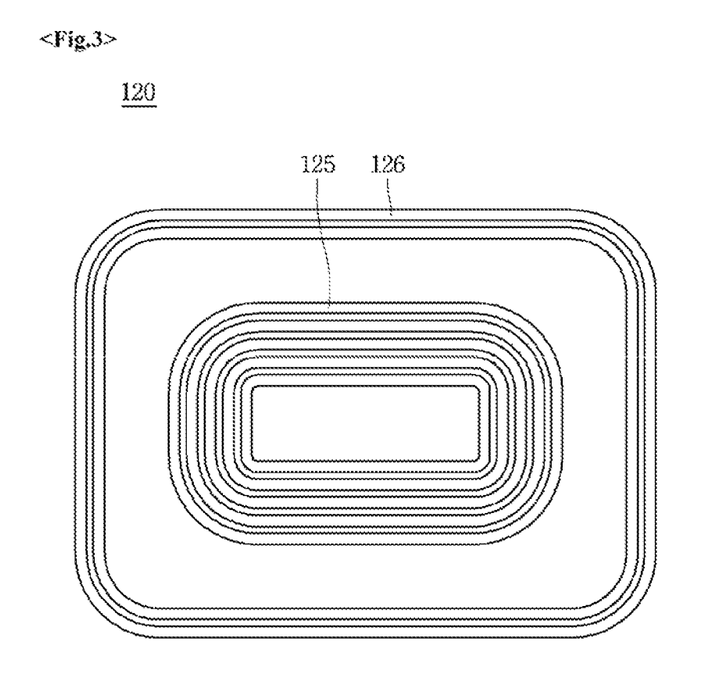
FIG. 3 is a plan view showing an example of a wireless transmission unit in FIG. 2.
Figure 4:
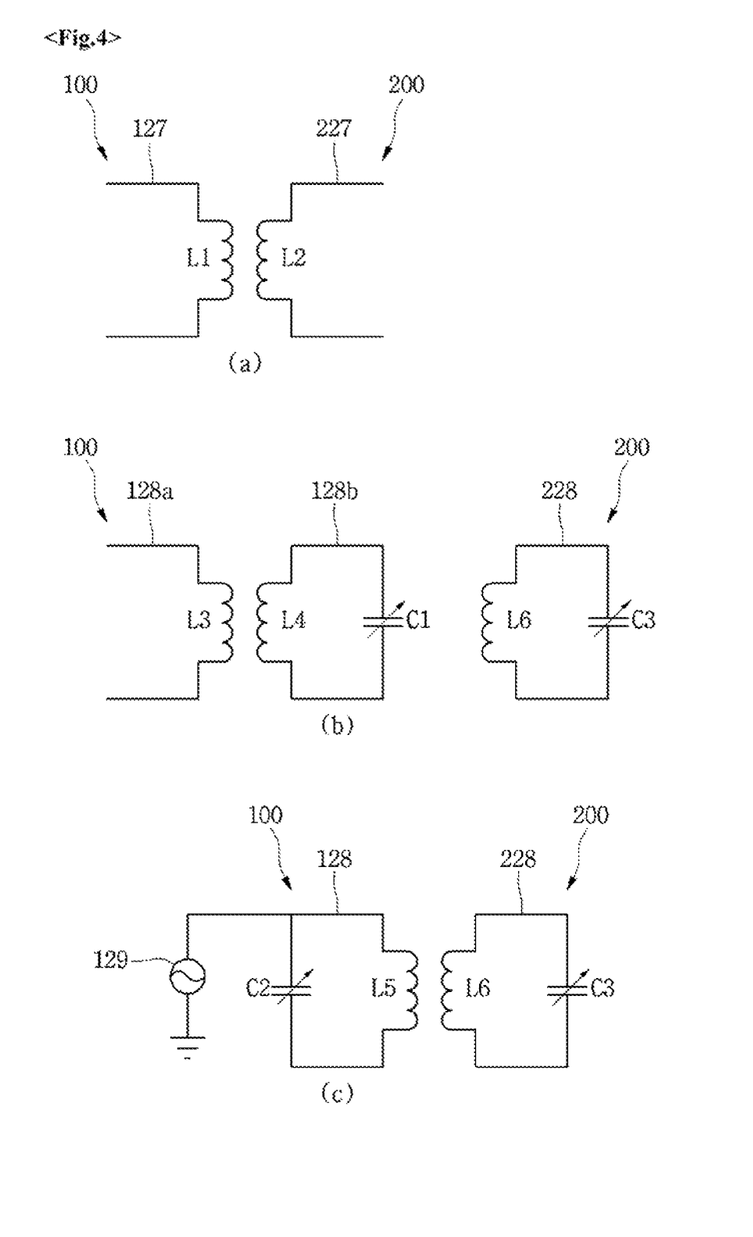
FIG. 4 is a circuit diagram showing an equivalent circuit of the wireless transmission unit in FIG. 2.

FIG. 2 is a block diagram showing an internal configuration of the wireless power transmission apparatus according to the embodiment. FIG. 3 is a plan view showing an example of a wireless transmission unit in FIG. 2 and FIG. 4 is a circuit diagram showing an equivalent circuit of the wireless transmission unit in FIG. 2.

Referring to FIG. 2, the wireless power transmission apparatus 100 of the embodiment includes an interface unit 110, a wireless transmission unit 120, a memory 130 and a controller 140.

The interface unit 110 provides an interface with the power source 11 in the wireless power transmission apparatus 100. In other words, the interface unit 110 is connected to the power source 11. In this case, the interface unit 110 may be connected to the power source 11 by a wire. In addition, the interface unit 110 receives the power from the power source 11.

The wireless transmission unit 120 wirelessly transmits the power in the wireless power transmission apparatus 100. In this case, the wireless transmission unit 120 transmits the power according to numerous transmission schemes. In this case, the transmission schemes include an electromagnetic induction scheme, a resonance scheme, and an RF/micro wave radiation scheme.

In addition the wireless transmission unit 120 includes a first wireless transmission unit 121 and a second wireless transmission unit 123. The first wireless transmission unit 121 has a first transmission scheme. In other words, the first wireless transmission unit 121 transmits the power according to the first transmission scheme. In this case, the first transmission scheme may be any one of the electromagnetic induction scheme, the resonance scheme, and the RF/micro wave radiation scheme. The second wireless transmission unit 123 has a second transmission scheme. In other words, the second wireless transmission unit 123 transmits the power according to the second transmission scheme. In this case, the second transmission scheme is different from the first transmission scheme, and may be any one of the electromagnetic induction scheme, the resonance scheme, and the RF/micro wave radiation scheme.

In this case, the first wireless transmission unit 121 and the second wireless transmission unit 123 may be implemented as an inner coil 125 and an outer coil 126 as shown in FIG. 3. In this case, the inner coil 125 may include one winding wire, and, even though not shown, may include three winding wires. In addition the outer coil 126 may include one winding wire. Further, the inner coil 125 may be positioned at an inner part of the outer coil 126 so that the outer coil 126 surrounds the inner coil 125. In other words, the first wireless transmission unit 121 may be positioned at an inner part of the second wireless transmission unit 123, so that the second wireless transmission unit 123 surrounds the first wireless transmission unit 121. Otherwise, the second wireless transmission unit 123 may be positioned at an inner part of the first wireless transmission unit 121, so that the first wireless transmission unit 121 surrounds the second wireless transmission unit 123.

Further, when the first transmission scheme of the first wireless transmission unit 121 or the second transmission scheme of the second wireless transmission unit 123 is the electromagnetic induction scheme, the first wireless transmission unit 121 or the second wireless transmission unit 123 may include a transmission induction coil 127 as shown in (a) of FIG. 4. In this case, the transmission induction coil 127 may be designated as a first inductor L1 Accordingly, the transmission induction coil 127 may transmit the power by the electromagnetic induction scheme.

Correspondingly, when the reception scheme of the wireless power reception apparatus 200 is the electromagnetic induction scheme, the wireless power reception apparatus 200 may include a reception induction coil 227. In this case, the reception induction coil 227 may be designated as a second inductor L2. Accordingly, when the reception induction coil 227 is positioned facing the transmission induction coil 127, the transmission induction coil 127 may transmit the power to the reception induction coil 227 by the electromagnetic induction scheme.

Meanwhile, when the first transmission scheme of the first wireless transmission unit 121 or the second transmission scheme of the second wireless transmission unit 123 is the resonance scheme, the first wireless transmission unit 121 or the second wireless transmission unit 123 may include a transmission induction coil 128a and a transmission resonance coil 128b as shown in (b) of FIG. 4. In this case, the transmission induction coil 128a may be designated as a third inductor L3. In addition, the transmission resonance coil 128b may be designated as a fourth inductor L4 and a first capacitor C1. In this case, the fourth inductor L4 and a first capacitor C1 may be connected in parallel with each other. Accordingly, the transmission induction coil 128a may transmit the power to the transmission resonance coil 128b by the electromagnetic induction scheme, and the transmission resonance coil 128b may transmit the power in the resonance scheme.

Otherwise, when the first transmission scheme of the first wireless transmission unit 121 or the second transmission scheme of the second wireless transmission unit 123 is the resonance scheme, the first wireless transmission unit 121 or the second wireless transmission unit 123 may include a transmission resonance coil 128 as shown in (c) of FIG. 4, and the transmission resonance coil 128 may be connected to an AC power source 129. In this case, the AC power source 129 applies an AC power to the transmission resonance coil 128. In this case, the AC power source 129 may be an interface unit 110 connected to the power source 11 or a power supply unit 141 of a controller 140. In addition, the transmission resonance coil 128 may be designated as a fifth inductor L5 and a second capacitor C2. In this case, the fifth inductor L5 and the second capacitor C2 may be connected in parallel with each other. Accordingly, when the AC power is applied from the AC power source 129, the transmission resonance coil 128 may transmit the power by the resonance scheme.

Correspondingly, when the reception scheme of the wireless power reception apparatus 200 is the resonance scheme, the wireless power reception apparatus 200 may include a reception resonance coil 228. In this case, the reception resonance coil 228 may be designated a sixth inductor L6 and a third capacitor C3. In this case, the sixth inductor L6 and the third capacitor C3 may be in parallel with each other. Accordingly, when the reception resonance coil 228 is positioned to face the transmission resonance coils 128a and 128, the transmission resonance coils 128a and 128 may transmit power by the resonance scheme.

The memory 130 stores programs for the whole operation of the wireless power reception apparatus 200. In this case, the memory 130 uses any one of the first wireless transmission unit 121 and the second wireless transmission unit 123 to store the program for transmitting the power. In addition, the memory 130 stores data created while executing the programs.

The controller 140 controls the whole operation of the wireless power reception apparatus 200. In this case, the controller 140 uses any one of the first wireless transmission unit 121 and the second wireless transmission unit 123 to transmit the power. Accordingly, the controller may selectively or sequentially activate the first wireless transmission unit 121 or the second wireless transmission unit 123 to identify the reception scheme of the wireless power reception apparatus 200. In addition, in response to the reception scheme of the wireless power reception apparatus 200, the controller 141 may transmit the power by any one of the first transmission scheme of the first wireless transmission unit 121 and the second transmission scheme of the second wireless transmission unit 123.

In detail, the controller 140 may activate the first wireless transmission unit 121 and deactivate the second wireless transmission unit 123 to identify the reception scheme of the wireless power reception apparatus 200. In addition, when the reception scheme of the wireless power reception apparatus 200 is same as the first transmission scheme of the first wireless transmission unit 121, the controller 140 may transmit the power by the first transmission scheme. Meanwhile, when the reception scheme of the wireless power reception apparatus 200 is different from the first transmission scheme of the first wireless transmission unit 121, the controller 140 deactivates the first wireless transmission unit 121 and activates the second wireless transmission unit 123 to identify the reception scheme of the wireless power reception apparatus 200. In addition, when the reception scheme of the wireless power reception apparatus 200 is same as the second transmission scheme of the second wireless transmission unit 123, the controller 140 may transmit the power by the second transmission scheme.

In addition, the controller 140 includes a power supply unit 141 and a detection unit 143. The power supply unit 141 outputs the power to any one of the first wireless transmission unit 121 and the second wireless transmission unit 123. In this case, the power supply unit 141 outputs the power having a predetermined value and a preset current and voltage. The detection unit 143 detects a variation of the current between the power supply unit 141 and the wireless transmission unit 120. In this case, the detection unit 143 detects the variation of the current at an output terminal of the power supply unit 141 or the input terminal of the wireless transmission unit 120. In this case, the detection unit 143 includes a current sensor.

Before the controller 140 identifies the reception scheme of the wireless power reception apparatus 200, the controller may determine whether the wireless power reception apparatus 200 corresponding to the wireless power transmission apparatus 100 exists. In this case, various parameters are set corresponding to the power supply unit 141. In this case, the parameters may be set to different values according to the first transmission scheme and the second transmission scheme. In detail, the parameters may include a time period for the power supply unit 141 to convert from a deactivated state to an activated state, a time interval for the power supply unit 141 to maintain the activated state, and a threshold value for detecting the current, the voltage and the variation of the current outputted from the power supply unit 141.

In other words, the power supply unit 141 may standby in the deactivated state in a standby mode in which the wireless power transmission apparatus 200 is not charging. In addition, the power supply unit 141 may be converted to the activated state in the preset time period to maintain the activated state for the preset time interval. In the activated state, the power supply unit 141 may output the power having the predetermined current and voltage. In addition, when the preset time interval elapses, the power supply unit 141 may be converted to the deactivated state. Accordingly, when the detection unit 143 detects the variation of the current, the controller 140 may determine that the wireless power reception apparatus 200 exists. In this case, the detection unit 143 may detect the current between the power supply unit 141 and the wireless transmission unit 120 and compare the detected current with the threshold value to detect the variation of the current.

Figure 5:
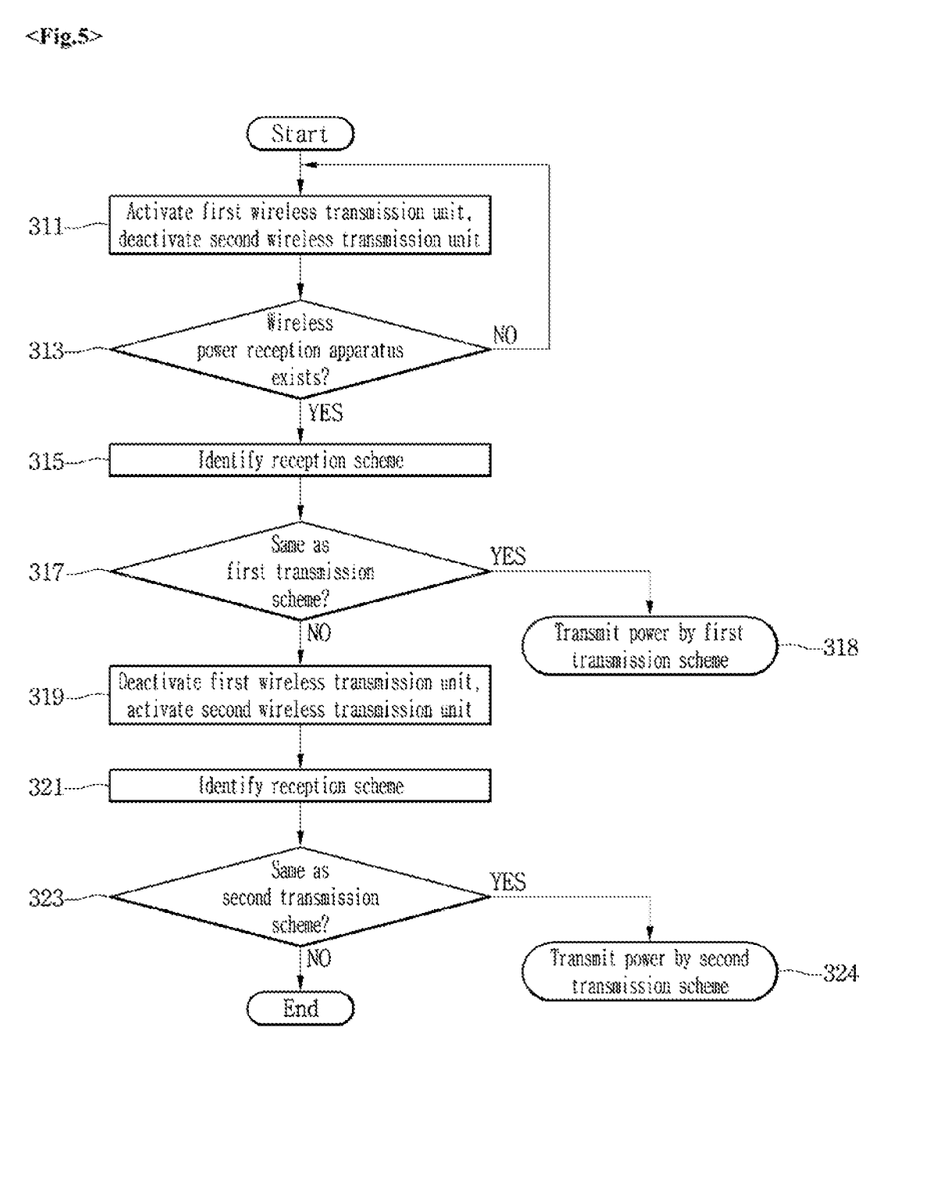
FIG. 5 is a flowchart showing a process of a wireless power transmission method according to the embodiment.
Figure 6:
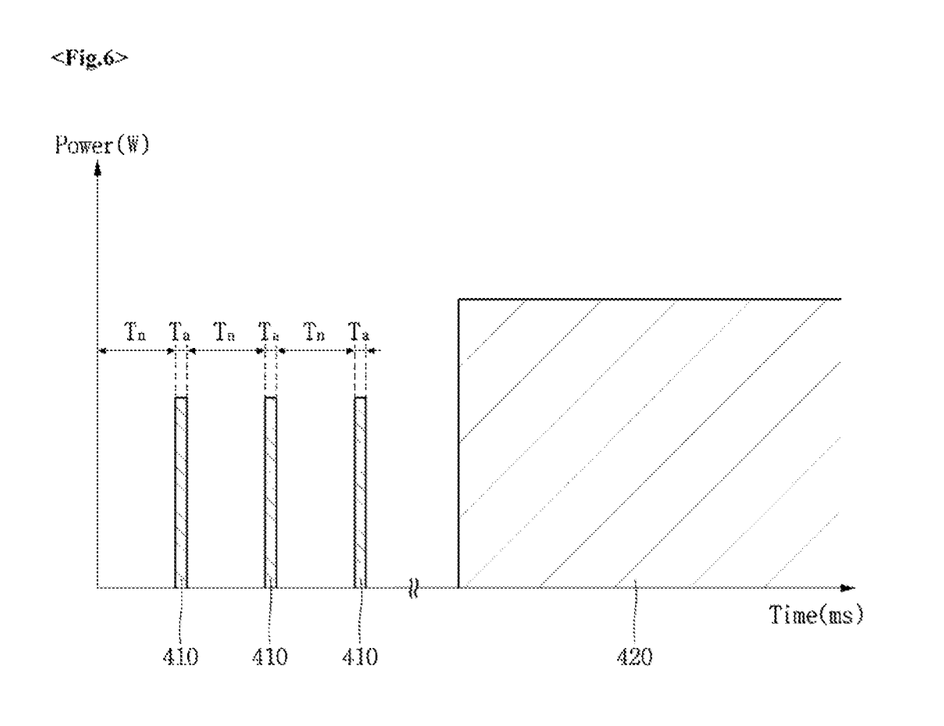
FIG. 6 is a view showing an example for explaining the wireless power transmission method according to the embodiment.

FIG. 5 is a flowchart showing a process of a wireless power transmission method according to an embodiment of the embodiment. In addition, FIG. 6 is a view showing an example for explaining the wireless power transmission method according to the embodiment.

Referring to FIG. 5, a process of the wireless power transmission method of the embodiment starts by the controller activating the first wireless transmission unit 121 in step 311. In addition, the controller 140 deactivates the second wireless transmission unit 123. In other words, the controller 140 does not simultaneously activate the first wireless transmission unit and the second wireless transmission unit 123.

Then, the controller 140, in step 313, determines whether the wireless power reception apparatus 200 exists corresponding to the wireless power transmission apparatus 100. In this case, even when the first wireless transmission unit 121 is activated, the power supply unit 141 may standby in the deactivated state. In addition, the power supply unit 141, as shown in FIG. 6, is periodically converted to the activated state to output the power 410 to the first wireless transmission unit 121. In detail, the power supply unit 141 may be converted to the activated state in the preset time period (Ta+Tn), and maintain the activated state for the preset time interval Ta. In the activated state, the power supply unit 141 may output the power 410 to the first wireless transmission unit 121. In this case, the power supply unit 141 may output the power 410 having the predetermined value and the preset current and voltage. In addition, when the preset time interval (Ta) elapses, the power supply unit 141 may be converted to the deactivated state. Accordingly, the detection unit 143 may detect the variation of the current between the power supply unit 141 and the first wireless transmission unit 121. In this case, when the variation of the current is detected, the controller 140 may determine that the wireless power reception apparatus 200 exists.

For example, when the first transmission scheme of the first wireless transmission unit 121 is the resonance scheme, the power supply unit 141 may be converted to the activated state in the time period (Ta+Tn) of 300 ms, and maintain the activated state for the time interval of 30 ms. In other words, after the power supply unit 141 repetitively maintains the deactivated state for the time interval of 270 ms, the power supply unit 141 may maintain the activated state for the time interval (Ta) for 30 ms. In this case, the power supply unit 141 may output the power 410 having the current of 15 mA and the voltage of 3 V. In this case, the threshold value for determining whether the wireless power reception apparatus 200 exists may be preset to 20 mA. Accordingly, when the current of 30 mA is detected between the power supply unit 141 and the first wireless transmission unit 121, the detection unit 143 may detect as the variation of the current. Otherwise, when the current of 19 mA is detected between the power supply unit 141 and the first wireless transmission unit 121, the detection unit 143 may not detect as the variation of the current.

Meanwhile, when the first transmission scheme of the first wireless transmission unit 121 is the electromagnetic induction scheme, the power supply unit 141 may be converted to the activated state in the time period (Ta+Tn) of 700 ms, and maintain the activated state for the time interval of 50 ms. In other words, after the power supply unit 141 repetitively maintains the deactivated state for the time interval of 650 ms, the power supply unit 141 may maintain the activated state for the time interval (Ta) for 50 ms. In this case, the power supply unit 141 may output the power 410 having the current of 20 mA and the voltage of 4 V. In this case, the threshold value for determining whether the wireless power reception apparatus 200 exists may be preset to 50 mA. Accordingly, when the current of 90 mA is detected between the power supply unit 141 and the first wireless transmission unit 121, the detection unit 143 may detect as the variation of the current. Otherwise, when the current of 40 mA is detected between the power supply unit 141 and the first wireless transmission unit 121, the detection unit 143 may not detect as the variation of the current.

Then, when the wireless power reception apparatus 200 is determined to exist in step 313, the controller identifies the reception scheme of the wireless power reception apparatus 200 in step 315. In this case, the controller 140 may request identification information of the wireless power reception apparatus 200. In this case, the controller 140 may request identification information of the wireless power reception apparatus 200 through the first wireless transmission unit 121. Then, in step 317, the controller 140 determines whether the reception scheme of the wireless power reception apparatus 200 is same as the first transmission scheme of the first wireless transmission unit 121. In this case, when the identification information is received from the wireless power reception apparatus 200, the controller may determine that the reception scheme of the wireless power reception apparatus 200 is same as the first transmission scheme of the first wireless transmission unit 121. Otherwise, when the identification information is received from the wireless power reception apparatus 200, the wireless power reception apparatus 200 analyzes the identification information to determine whether the reception scheme of the wireless power reception apparatus 200 is same as the first transmission scheme of the first wireless transmission unit 121.

Then, in step 317, when the reception scheme of the wireless power reception apparatus 200 is determined to be same as the first transmission scheme of the first wireless transmission unit 121, in step 318, the controller 140 transmits the power by the first transmission scheme of the first wireless transmission unit 121. In other words, the controller 140 transmits the power through the first wireless transmission unit 121. In this case, as shown in FIG. 6, the power supply unit 141 may output the power. In this case, the controller 140 may transmit the power for a preset period of time or a predetermined amount. Then, the controller may return to step 311.

Meanwhile, in step 317, when the reception scheme of the wireless power reception apparatus 200 is determined to be different from the first transmission scheme of the first wireless transmission unit 121, the controller 140 deactivates the first wireless transmission unit 121 in step 319. In addition, the controller 140 activates the second wireless transmission unit 123. In other words, the controller 140 does not simultaneously activate the first wireless transmission unit 121 and the second wireless transmission unit 123.

Then, the controller 140 identifies the reception scheme of the wireless power reception apparatus 200 in step 321. In this case, the controller 140 may request the identification information of the wireless power reception apparatus 200. In this case, the controller 140 may request the identification information of the wireless power reception apparatus 200 through the second wireless transmission unit 122. Then, the controller 140 determines whether reception scheme of the wireless power reception apparatus 200 is same as the second transmission scheme of the second wireless transmission unit 123. In this case, when the identification information is received from the wireless power reception apparatus 200, the controller may determine that the reception scheme of the wireless power reception apparatus 200 is same as the second transmission scheme of the second wireless transmission unit 123. Otherwise, when the identification information is received from the wireless power reception apparatus 200, the wireless power reception apparatus 200 analyzes the identification information to determine whether the reception scheme of the wireless power reception apparatus 200 is same as the first transmission scheme of the second wireless transmission unit 123.

Then, in step 323, when the reception scheme of the wireless power reception apparatus 200 is determined to be same as the second transmission scheme of the second wireless transmission unit 123, in step 324, the controller 140 transmits the power by the second transmission scheme of the second wireless transmission unit 123. In other words, the controller 240 transmits the power through the second wireless transmission unit 123. In this case, the power supply unit 141 may output the power as shown in FIG. 6. In this case, the controller 140 may transmit the power for the preset period of time or the predetermined amount. Then, the controller 140 may return to step 311.

Meanwhile, in step 323, when the reception scheme of the wireless power reception apparatus 200 is determined to be different from the second transmission scheme of the second wireless transmission unit 121, the controller 140 may return to step 311.

According to the embodiment, because the wireless power transmission apparatus 100 can transmit the power in numerous transmission schemes, the wireless power reception apparatus 200 having various reception schemes can be charged. In this case, because the first wireless transmission unit 121 and the second wireless transmission unit 123 are simultaneously activated, interference between the first wireless transmission unit 121 and the second wireless transmission unit 123 may occur. Therefore, the wireless power reception apparatus 200 of the embodiment selectively or sequentially activates the first wireless transmission unit 121 and the second wireless transmission unit 123 so that the interference between the first wireless transmission unit 121 and the second wireless transmission unit 123 can be prevented from occurring. Thus, the wireless power reception apparatus 200 of the embodiment can more efficiently transmit the power. In other words, the wireless power transmission apparatus 100 can more efficiently charge the wireless power reception apparatus 200.

Meanwhile, it should be understood that the disclosure is not limited to the embodiments and may be embodied in different ways, and that the embodiments are given to provide complete disclosure and to provide thorough understanding to those skilled in the art. In other words, it will be understood by those of ordinary skill in the art that various substitutions, changes in form and alterations may be made therein without departing from the spirit and the scope of the disclosure.

What is claimed is:

1. A wireless power transmission apparatus comprising,
   a first wireless transmission unit having a first transmission scheme;
   a second wireless transmission unit having a second transmission scheme; and
   a controller to determine whether a wireless power reception apparatus exists, identify a reception scheme when the wireless power reception apparatus exists, and transmit a power by the first transmission scheme or the second transmission scheme according to the identified reception scheme,
   wherein the controller activates the first wireless transmission unit, deactivates the second wireless transmission unit, and transmits the power by the first transmission scheme when the reception scheme of the wireless power reception apparatus is identical to the first transmission scheme, and
   wherein the controller comprises a power supply unit to output power to the first wireless transmission unit or the second wireless transmission unit in a predetermined current, and a detection unit to detect a variation of the current at an output terminal of the power supply unit.

2. The wireless power transmission apparatus according to claim 1, wherein the controller deactivates the first wireless transmission unit and activates the second wireless transmission unit when the reception scheme is different from the first transmission scheme, and transmits the power by the second transmission scheme when the reception scheme is identical to the second transmission scheme.

3. The wireless power transmission apparatus according to claim 2, wherein the controller activates the first wireless transmission unit and deactivates the second wireless transmission unit when the reception scheme is different from the second transmission scheme.

4. The wireless power transmission apparatus according to claim 1, wherein the power supply unit outputs the power for a preset time interval in a preset time period.

5. The wireless power transmission apparatus according to claim 1, wherein the controller determines that the wireless power reception apparatus exists when the variation of the current is detected.

6. The wireless power transmission apparatus according to claim 1, wherein the detection unit comprises a current sensor.

7. The wireless power transmission apparatus according to claim 1, wherein the first transmission scheme is an electromagnetic induction scheme, and the first wireless transmission unit includes a transmission induction coil transmitting the power.

8. The wireless power transmission apparatus according to claim 7, wherein the second transmission scheme is a resonance scheme, and the second wireless transmission unit includes a transmission resonance coil transmitting the power.

9. The wireless power transmission apparatus according to claim 1, wherein the first transmission scheme is a resonance scheme, and the first wireless transmission unit includes a transmission resonance coil transmitting the power.

10. The wireless power transmission apparatus according to claim 9, wherein the second transmission scheme is an electromagnetic induction scheme, and the second wireless transmission unit includes a transmission induction coil transmitting the power.

11. The wireless power transmission apparatus according to claim 1, wherein the first transmission scheme is a resonance scheme, and the second transmission unit includes a transmission resonance coil connected to an AC power.

* * * * *